US007332215B2

(12) United States Patent
Tokura et al.

(10) Patent No.: US 7,332,215 B2
(45) Date of Patent: Feb. 19, 2008

(54) RESIN-MOLDED COMPONENT AND METHOD FOR MANUFACTURING THEREOF AS WELL AS DIAPHRAGM FOR LOUDSPEAKER

(75) Inventors: Kunihiko Tokura, Tokyo (JP); Masaru Uryu, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/860,739

(22) Filed: Jun. 3, 2004

(65) Prior Publication Data

US 2004/0265564 A1 Dec. 30, 2004

(30) Foreign Application Priority Data

Jun. 11, 2003 (JP) .......................... P2003-167006

(51) Int. Cl.
  *B32B 5/20* (2006.01)
  *H04R 7/12* (2006.01)
(52) U.S. Cl. ................ 428/318.8; 428/318.6; 428/319.3; 428/319.7; 428/316.6; 428/34.1; 428/36.5; 428/34.6; 181/167; 181/170; 181/173
(58) Field of Classification Search ............ 428/316.6, 428/319.3, 319.7, 319.9, 318.6, 318.8, 34.1, 428/36.5, 34.6; 181/167, 170, 173
See application file for complete search history.

(56) References Cited

U.S. PATENT DOCUMENTS 4,996,011 A * 2/1991 Sano et al. .................. 264/28

5,215,691 A * 6/1993 Bland et al. ............... 264/45.9
5,645,779 A   7/1997 Matsumoto ................ 264/45.5
6,334,504 B1  1/2002 Sato et al. ................. 181/167

FOREIGN PATENT DOCUMENTS

| EP | 944292 A2 * | 9/1999 |
| EP | 1075921 A2  | 2/2001 |
| GB | 2110215 A * | 6/1983 |

OTHER PUBLICATIONS

Translation of JP 11-080408, "Preparation of Resin Foam", Takako et al, Mar. 26, 1999.*

* cited by examiner

*Primary Examiner*—Hai Vo
(74) *Attorney, Agent, or Firm*—Lerner, David, Littenberg, Krumholz & Mentlik, LLP

(57) ABSTRACT

A resin-molded component such as a loudspeaker diaphragm, in which rigidity is enhanced while light weight and high specific modulus of elasticity are maintained, is formed by applying carbon dioxide gas with a predetermined pressure to a thermoplastic resin in which crystallization is facilitated in the resin flowing direction to fill a mold. After the resin is filled, injection molding is performed by somewhat moving the mold to form five layers of: oriented minute-foaming layers, having approximately cylindrical foams, the length of which is twice the diameter thereof in the resin flowing direction in the mold, an unfoamed core layer positioned between both the foaming layers, and unfoamed skin layers formed on the front and rear surfaces.

2 Claims, 5 Drawing Sheets

FIG. 5

| | Resin | Gas Pressure MPa | Mold Opening mm | Surface Thickness mm | Density g/cm2 | Young's Morulus GPa | Rigidity | Specific Modulus |
|---|---|---|---|---|---|---|---|---|
| Practice Example 1 | Specialized Polyolefin Resin | 6 | 0.2 | 0.52 | 0.74 | 5.51 | 3.37 | 7.45E+06 |
| Practice Example 2 | Specialized Polyolefin Resin | 6 | 0.4 | 0.68 | 0.60 | 4.43 | 5.06 | 7.38E+06 |
| Practice Example 3 | Specialized Polyolefin Resin | 6 | 0.6 | 0.85 | 0.52 | 2.80 | 7.48 | 5.38E+06 |
| Comparative Example 1 | Specialized Polyolefin Resin | 6 | 0.0 | 0.30 | 0.97 | 8.52 | 1.00 | 8.74E+06 |
| Comparative Example 3 | PP | — | 0.2 | 0.49 | 0.53 | 1.20 | 0.61 | 2.26E+06 | under# RESIN-MOLDED COMPONENT AND METHOD FOR MANUFACTURING THEREOF AS WELL AS DIAPHRAGM FOR LOUDSPEAKER

BACKGROUND OF THE INVENTION

1. Field of the Invention

The present invention related to a resin-molded component, a method for manufacturing thereof, and a resin-molded diaphragm used in a loudspeaker.

2. Description of the Related Art

Conventionally, there has been known a diaphragm for a loudspeaker, which is composed of a resin-molded component. Hereupon, in order to expand the piston movement area, a diaphragm is required to have a large specific modulus $E/\rho$ (E: elasticity modulus, $\rho$: density) and a large internal loss to obtain a flat frequency characteristic. Therefore, in the case of a diaphragm composed of a resin-molded component, in order to improve an elasticity modulus, a material in which high-modulus fiber or filler is highly filled in thermoplastic resin having comparatively large internal loss has been conventionally used through injection molding or sheet forming. However, due to the increase in the amount of those additives relative density of materials increases, which causes the rising of the specific modulus and reduces a resin streak length in injection molding to makes it difficult to be thinly loaded. Accordingly, the above described characteristics of large specific modulus and large internal loss have been limited in improvement thereof.

In order to improve the specific modulus, conventionally a method to reduce the density has been taken. It is known that in a diaphragm made of a polymeric material, chemical foaming agent is added to obtain a molded diaphragm. As a result of foaming, light weight can be realized; however, the diameter of foams becomes large to considerably decline Young's modulus and improvement in specific modulus can not be obtained. Moreover, foamed shape is not uniform so that outer appearance may be unattractive, which is one of problems. Lately, a foamed diaphragm, in which injection molding, chemical foaming, and reinforcing fiber are combined, is proposed.

On the other hand, with respect to resin-molding technology, micro cellular technology is lately known as a method for forming a pored foamed cell, in which supercritical fluid is used to uniformly disperse the foamed cells with the foaming density of $10^9/cm^2$ or more. According to the method, resin-molded products can be made light in weight without deteriorating the strength thereof.

Patent document 1 discloses the art relating to the above described micro cellular technology.

Also, Patent document 2 discloses the art relating to the above described foamed diaphragm in which injection molding, chemical foaming, and a reinforcing fiber are combined to be used.

[Patent document 1]

Japanese Translation of PCT International Application No. H6-506724

[Patent document 2]

Japanese Published Patent Application No. H8-340594

In a foamed diaphragm formed by combining injection molding, chemical foaming, and a reinforcing fiber, since cells are foamed longitudinally in the plane thickness direction within a skin layer of the diaphragm when injection molding is performed, effectiveness of reinforcing the skin layer is attained. However, each of the foamed cells has a large diameter such as several hundred μm due to chemical foaming, so that it is extremely difficult to control the size thereof and to obtain the state in which the whole plane is uniformly foamed. In order to compensate the above situation, a reinforcing fiber is also employed; however, the fiber does not act to reinforce the inside foaming cells and there remains limits on improvement in the specific modulus.

On the other hand, a diaphragm of sheet form obtained by means of a method employing the micro-cellular technology has been known, in which a crystalline thermoplastic resin sheet is impregnated with supercritical carbon dioxide gas to form simultaneously with pressure release a uniform micro-cellular sheet of approximately 10 μm. The above diaphragm of sheet form has uniformity compared to conventional foamed sheet and also has a superior appearance. However, since a sheet made of a single material such as polyester resin is used as an unfoamed crystalline resin, elastic modulus thereof is low compared to materials used for conventional diaphragms and the elastic modulus is further deteriorated after foaming. Accordingly, although specific gravity is small, elastic modulus is greatly declined, which becomes a problem when used as a diaphragm.

Further, an injection-molded diaphragm, to which this technology is applied, is also known. In the case of the micro-cellular technology, carbon dioxide gas is fed to the inside of a cylinder of a forming machine in a supercritical condition (at 7.4 MPa or higher pressure, at 31° C. or higher temperature) to form a solvent resin in which dissolved carbon dioxide is oversaturated, and simultaneously with the forming in a mold, pressure is released to cause minute foams. However, when for example a thin diaphragm is injection-molded, resin tends to solidify rapidly, so that it becomes extremely difficult to form a uniformly-foamed body on injection molding as proposed.

The object of the present invention is to provide a resin-molded component and a resin-molded loud-speaker diaphragm, in which the above problems are solved, light-weight is facilitated, specific modulus is maintained at a high level, and rigidity is enhanced.

SUMMERY OF THE INVENTION

In the present invention, carbon dioxide gas is continuously applied at a predetermined pressure to a thermoplastic resin in which crystallization is facilitated in the flowing direction of the resin to fill a mold; and after the resin is filled, the mold is moved by a certain amount to perform injection-molding by which are formed five layers of: a first and second foaming layers each having approximately cylindrical foams, the length of which is twice or more the diameter thereof in the flowing direction of the resin in the mold, an unfoamed core layer positioned between both the foaming layers, and unfoamed skin layers formed on the front and rear surfaces.

Accordingly, specific modulus and rigidity are maintained at higher levels to form a resin-molded component in light weight, having preferable characteristics when for example used as a diaphragm of a loud speaker.

BRIEF DESCRIPTION OF THE DRAWINGS

FIG. 5 is a table showing the measurement results of physicality with respect to a diaphragm according to the present invention and the other diaphragms;

DESCRIPTION OF THE PREFERRED EMBODIMENTS

Hereinafter, an embodiment of the present invention will be described with reference to FIGS. 1 to 7.

Figure 1:
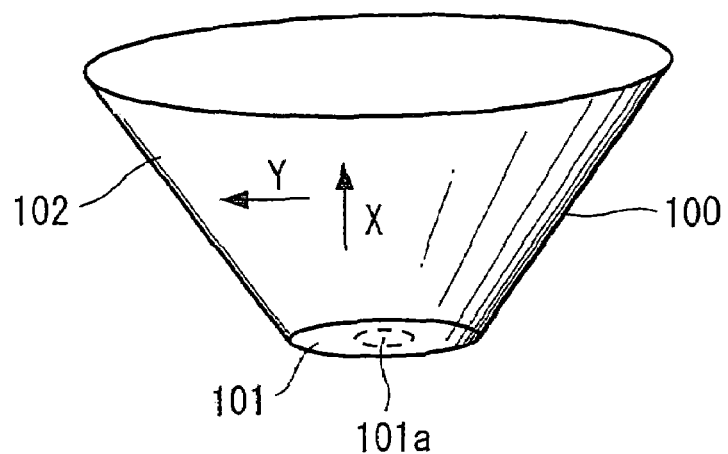
FIG. 1 is a perspective view showing the shape of a diaphragm according to an embodiment of the present invention.

As an example of a resin-molded component according to the embodiment, the example in which the present invention is applied to a diaphragm of a loud speaker is explained. FIG. 1 shows an example of the shape of the diaphragm of this embodiment. A diaphragm 100 according to this embodiment is a cone-shape diaphragm of 110 mm in outer diameter, 30 mm in inner diameter, and 0.30 mm in thickness. When the diaphragm is formed, resin is filled from a cold gate of the mold disposed at a forming apparatus through a film gate using a resin injecting portion 101a on a central portion 101 to uniformly spread over a thin vibrating portion 102 from the central portion 101a. In this example, thermoplastic resin in which crystallization is facilitated in the resin flowing direction is used as a resin to be formed into the diaphragm 100; and by dissolving carbon dioxide gas when molded, a foaming layer having minute foaming cells is formed within resin itself constituting the diaphragm 100. Processing to form the foaming layer will later be described.

Figure 2:
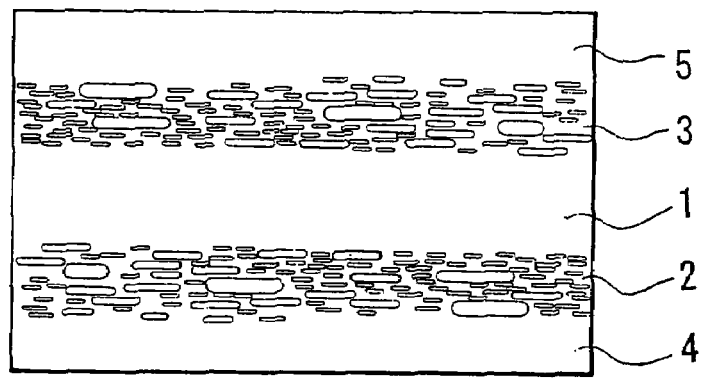
FIG. 2 is a sectional view showing a cross section in the resin flowing direction of a diaphragm according to an embodiment of the present invention.
Figure 3:
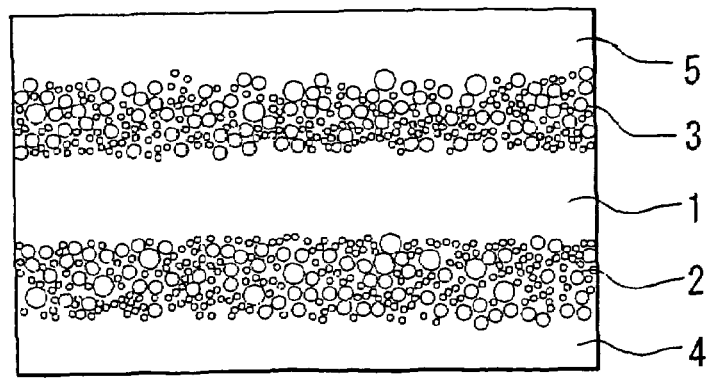
FIG. 3 is a sectional view showing a cross section in the direction perpendicular to the resin flowing direction of a diaphragm according to an embodiment of the present invention.
Figure 6:
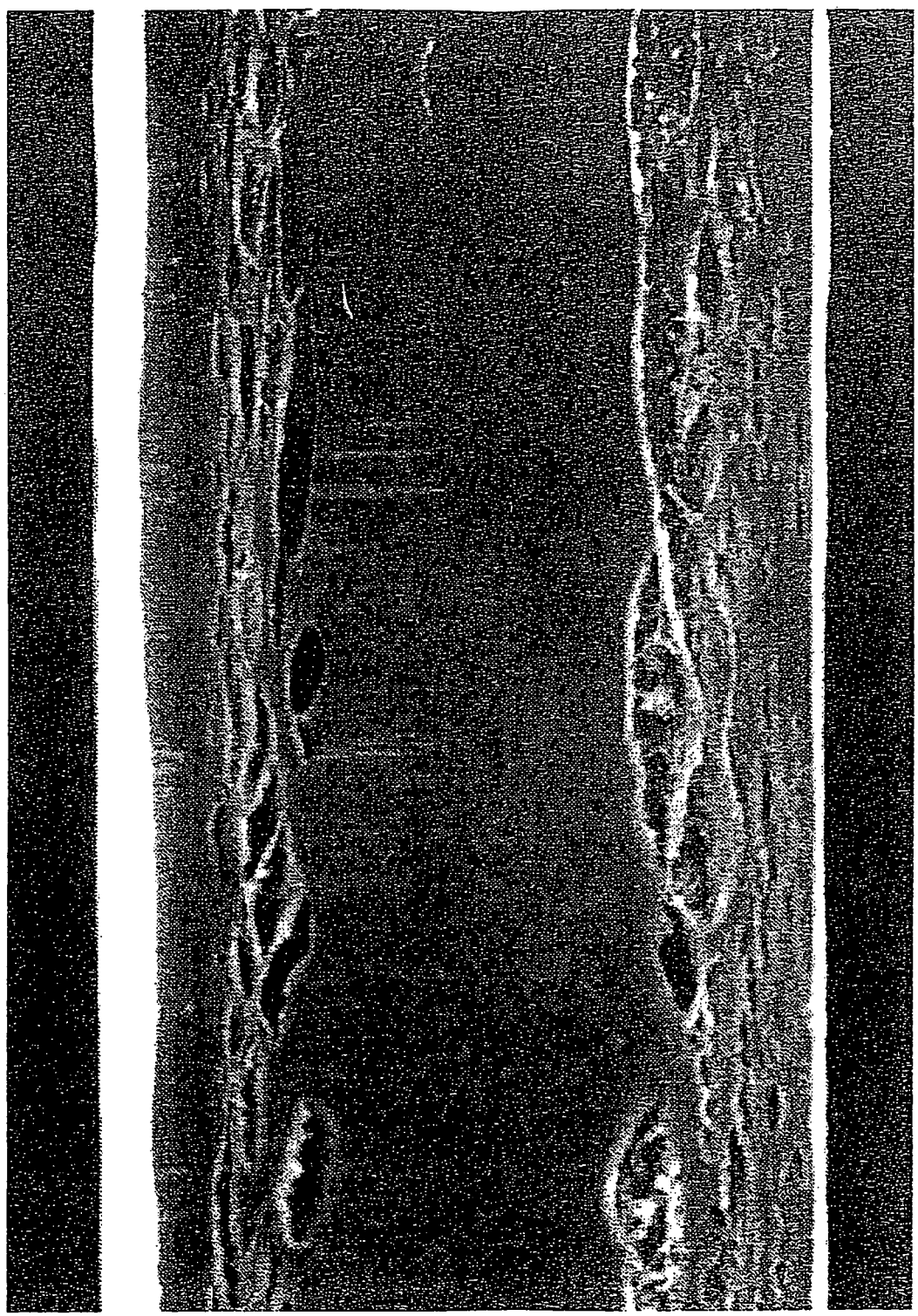
FIG. 6 is a micrograph corresponding to FIG. 2.
Figure 7:
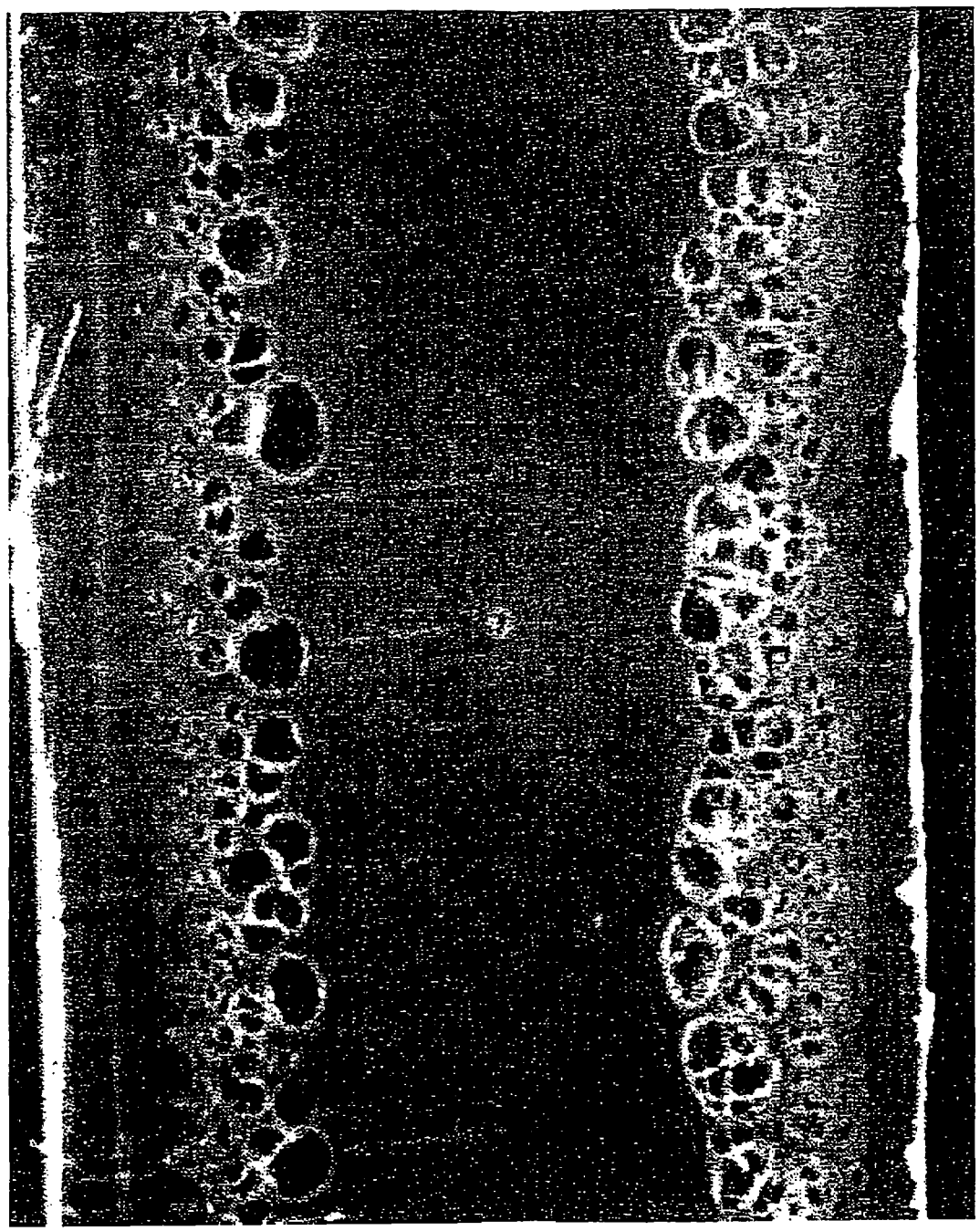
FIG. 7 is a micrograph corresponding to FIG. 3.

FIGS. 2 and 3 show the cross sections of the vibrating portion 102 of the diaphragm 100 shown in FIG. 1. FIG. 2 shows the cross section in the resin flowing direction, that is, in the X direction shown in FIG. 1, and FIG. 3 shows the cross section in the direction perpendicular to the resin flowing direction, that is, in the Y direction shown in FIG. 1. Further, FIG. 6 is a micrograph corresponding to FIG. 2 and FIG. 7 is a micrograph corresponding to FIG. 3. The resin foaming structure of the vibrating portion 102 has five layers of: an unfoamed core layer 1 formed in the center, oriented minute-foaming layers 2, 3 formed on both surfaces of the core layer 1, and unfoamed skin layers 4, 5 each positioned outside the oriented minute-foaming layers, and the whole thickness is approximately 0.1 mm to 1 mm.

Each of the foaming cells formed in the oriented minute-foaming layers 2, 3 has a cylindrical-shape of 50 μm or less in diameter and the length of twice or more the diameter. Specifically, when the cross section is shown in the X direction, that is the direction of flowing resin on forming, of FIG. 2, each of the foaming cells has an elongate shape; and when the cross section is shown in the Y direction, each of the foaming cells has an approximately circular shape. The diameter of circular cells shown in FIG. 3 is 50 μm or less. Numerous foaming cells are dispersed in the oriented minute foaming portion, which constitutes 50% or less of the whole thickness of the diaphragm. Those foaming cells exist only in the oriented minute-foaming layers 2, 3, and are not formed in the core layer 1 and the skin layers 4, 5 similarly containing carbon dioxide gas.

Hereinafter, the principle of generating foaming cells of the above cylindrical shape will be described. Conventionally, in the case where thinly-molded products such as a diaphragm are manufactured, resin solidifies rapidly, so that even if carbon dioxide gas is dissolved, resin viscosity sufficient to generate foams can not be obtained. However, in the case of this embodiment where thermoplastic resin, in which crystallinity is facilitated in the resin flowing direction, is used and crystal orientation is underway on filling the resin, the resin portion is fibrillated to cause the dissolved carbon dioxide gas to specifically foam in the resin flowing direction.

Only such resin materials as capable of forming a crystal oriented portion when forming a thin product such as a diaphragm can be selected to use among thermoplastic resin materials in which crystallinity is facilitated in the resin flowing direction. Particularly, it is preferable to use polyolefin containing ultra-high molecular polyolefin or the like, in which a crystal layer can be easily formed and elastic modulus is largely improved. Specifically, it is preferable that the resin is mainly made of polyolefin composition obtained by multistage-polymerization of ultra-high molecular polyolefin having an intrinsic viscosity of 10 to 40 dl/g in a decalin solution at 135° C. and ultra-high molecular polyolefin having an intrinsic viscosity of 1 to 5 dl/g in a decalin solution at 135° C.

Figure 4:
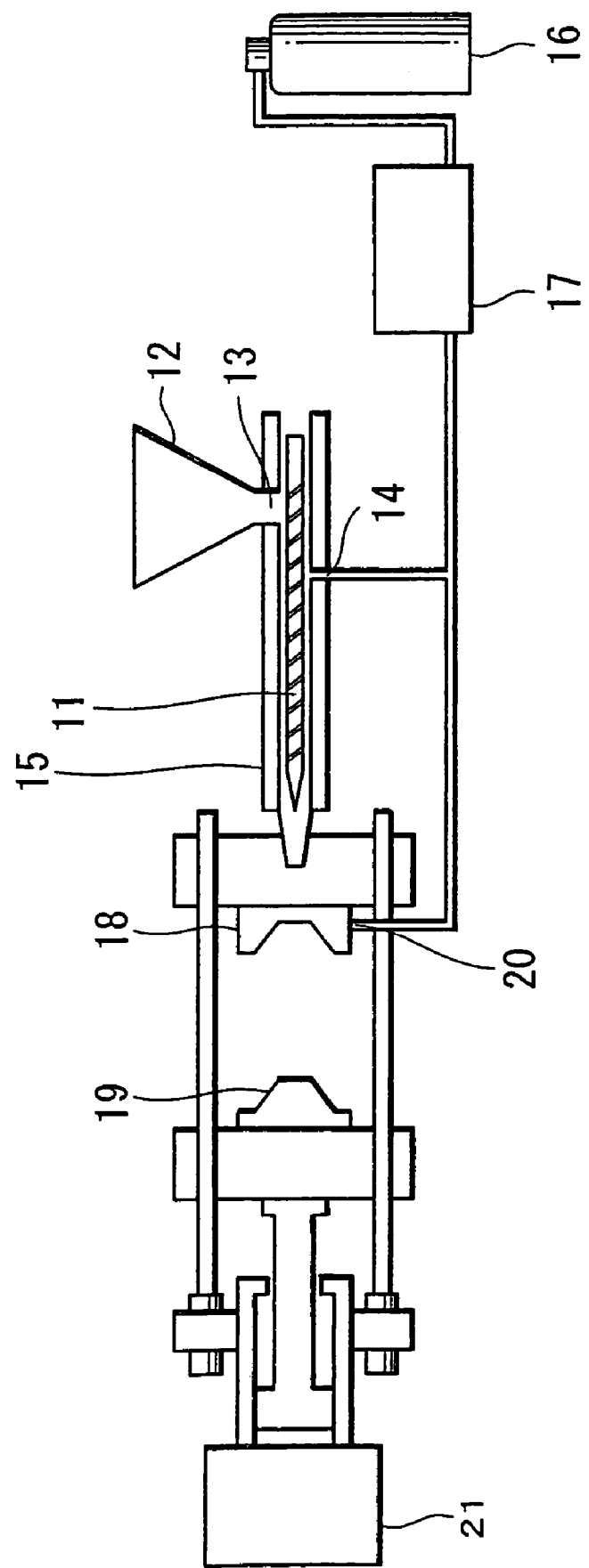
FIG. 4 is an explanatory view showing an example of the construction of an injection-molding machine according to an embodiment of the present invention.

A diaphragm according to this embodiment is formed by an injection molding method. FIG. 4 shows an outline of an injection molding apparatus to be used. The injection molding apparatus having a carbon dioxide gas injecting portion 14 capable of injecting carbon dioxide gas with pressure provided behind a hopper taking portion 13 is used, and resin as an ingredient is taken from a hopper 12 to be heated and melted in a plasticization screw portion 11. Carbon dioxide gas is injected into the plasticization screw portion 11 and is infiltrated into resin in a molten state in a plasticization cylinder 15. At this time, if the pressure of carbon dioxide supplied from a steel bottle 16 is lower than that of resin, injection will be difficult. Therefore, while the pressure of resin is detected, the pressure of gas needs to be adjusted and injected using a pressurizing pump 17. Although the pressure is not particularly specified as long as carbon dioxide is a gaseous body, is in a super-critical state or the like, solvent power of carbon dioxide gas for the resin needs to be high, so that the high pressure is preferable. However, more pressure increase than required will be a cause to generate large blisters on the surface of formed products, which is unfavorable.

Since resin at high pressure with carbon dioxide gas dissolved is injected into molds 18, 19 at a high speed, counter pressure or the like is given thereto while the molds are closed. In order to adjust the pressure inside the molds, it is preferable to have changed the inside pressure into that equivalent to the injected resin by feeding a pressure-adjusting gas injection portion 20 with carbon dioxide gas from the pressurizing pump 17, for example. Hence, it is preferable that the molds be packing-sealed with rubber or the like so that dissolved carbon dioxide gas cannot escape from the molds when resin is injected.

Further, a mold-clamping mechanism 21 of the injection molding apparatus uses hydraulic pressure of a direct pressure type, of an electric driving type or the like and is capable of releasing the molds to an extent of intended thickness immediately after the resin is injected so as to control the thickness of foaming. In this embodiment, the injection molding apparatus is a high-speed molding apparatus that includes an injecting unit of adjusted values of maximum injection pressure 2800 kg/cm², maximum injection speed 1500 mm/s, and rate of rise 10 ms.

Hereinafter, practice examples in which a diaphragm according to the embodiment of the present invention is formed, and comparative examples thereof will be explained.

PRACTICE EXAMPLE 1

Specialized polyolefin resin (brand name: LUBMER® L3000 manufactured by Mitsui Chemicals) made by multi-stage-polymerizing ultra-high molecular polyolefin and other high molecular polyolefin, which is one of the resin materials in which an oriented minute-foaming layer is apt to form on injection molding, was used in a practice example 1. Resin was injected from the hopper 12 and was heated to 280° C. and melted in the plasticization screw portion 11; and liquefied carbon dioxide gas from the steel bottle 16 was pressurized by the pressurizing pump 17 up to 6 Mpa and injected into the plasticization screw portion 11. The molds 18, 19 were filled with resin at a temperature of 80° C. and at an injection speed of 800 mm/s, pressure was maintained, and then the molds 18, 19 were opened by 0.2 mm to be cooled and a diaphragm was taken out.

As a result, a favorable molded product was obtained in which on the outer appearance skin layers were formed, and the whole of the diaphragm was uniformly foamed as shown in FIGS. 2 and 3. The thickness of the diaphragm obtained was 0.49 to 0.52 mm that was approximately similar to the amount of opening of the molds, and an expansion ratio of approximately 1.7 times was confirmed. When the diaphragm is cut in the direction perpendicular to the resin flowing direction and shown, foamed cells of a cylinder shape are exclusively generated in an oriented minute-foaming layer under the skin layer and those are not seen in the core layer. Each of the foamed cells has a cylindrical shape along the resin flowing direction and the diameter thereof is 50 μm or less. It is understood that because high-speed thin forming is performed, crystal orientation is facilitated in this portion.

PRACTICE EXAMPLE 2

The same resin as used in the practice example 1 was used for molding, and after resin was filled, molds were opened by the amount of 0.4 mm to further improve the expansion ratio. The thickness of the diaphragm obtained was approximately 0.7 mm, and the shape of foams was similar to those of the practice example 1.

PRACTICE EXAMPLE 3

The same resin as used in the practice examples 1 and 2 were used, and after resin was filled, molds were opened by the amount of 0.6 mm to mold a diaphragm. Though uniformity was not obtained on the surface of a diaphragm due to generation of a sink, similar shape to those of practice examples 1 and 2 was obtained with respect to the state of foams.

With those results of practice examples 1 to 3, it is recognized that resin was foamed without exceeding a predetermined extent even if carbon dioxide gas was dissolved, and a portion capable of foaming was limited to the oriented minute-foaming layers 2, 3, which was confirmed when seeing the cross section. Accordingly, it is understood that when resin is molded 1 mm or less in thickness, a favorable foaming condition can be obtained on molding.

COMPARATIVE EXAMPLE 1

The same resin as that of the practice example 1 was used to mold a diaphragm without opening the molds after filling the resin. Although carbon dioxide gas was dissolved in the resin, due to the thin thickness the resin solidified without any foams generated.

COMPARATIVE EXAMPLE 2

General-purpose polypropylene resin (hereinafter called PP) was used as a material to be filled at a temperature of 240° C. and at an injection speed of 800 mm/s. Similarly to the practice example 1, after the resin was filled, molds were opened by the amount of 0.2 mm and the pressure was released. As a result, the foaming phenomenon was hardly recognized and the thickness remained 0.3 mm of the initial state; in addition, since the molds were opened, uniformity could not be obtained with respect to the outer appearance thereof. In a system in which mica or other inorganic filler was added to PP, the result was the same as the above, and foams of carbon dioxide gas dissolved in resin could not be obtained on thin molding at a high speed and at a high pressure. As a result, it is understood that when using a general-purpose resin material in which carbon dioxide gas is dissolved, the foaming phenomenon can not be recognized in a thinly molded product such as a diaphragm, because resin tends to solidify rapidly. However, as shown in the embodiments of the present invention, with respect to the resin materials in which the fibrillation phenomenon is observed accompanied by crystalline orientation, the foaming phenomenon can be facilitated.

COMPARATIVE EXAMPLE 3

Similar PP to the above comparative examples was prepared, and a chemical foaming material of 0.1 pts.wt. was dry-blended therein to mold a diaphragm. A temperature on molding and a temperature of molds are set to 200° C. and 80° C., respectively; and resin is filled and after maintaining the pressure, the molds were opened by 0.2 mm to generate foams. While the foaming material generated nitrogen gas by decomposition at a predetermined temperature, a foamed product of approximately 0.5 mm was obtained though outer appearance was not favorable. When seen the cross section thereof, the diameter of foams was 100 μm or more, which is not small, and the shape was almost spherical to be randomly arranged by several numbers.

The measurement results of physical properties of the above practice examples 1 to 3 and comparative examples 1 and 3 measured by the vibration reed method are shown in FIG. 5. Samples for the measurement are prepared by cutting a diaphragm of 7 mm in the resin flowing direction thereof. Further, rigidity of samples are compared by regarding an unfoamed state of the comparative example 1 as the reference of rigidity 1.

According to the measurement results, though each specific modulus of practice examples 1 to 3 declines as the expansion ratio (the amount of opening of molds) increases, rigidity thereof greatly increases. Compared to that, a diaphragm of the comparative example 3 in which a foaming agent is added to PP has low specific modulus and low rigidity. Accordingly, when the embodiments of the present invention are employed, a diaphragm with favorable properties can be obtained by selecting an appropriate expansion ratio.

It should be noted that in the above embodiments explanations were given to a case in which a loudspeaker diaphragm was resin-molded; however, it may also possible to perform similar processing and obtain a minute foaming cell in a uniform state as shown in FIGS. 2 and 3, when other resin-molded components are formed.

According to the present invention, in the state in which a skin layer and a core layer are uniformly formed over the whole of a resin-molded component, minute foaming cells can be formed between the layers to form a oriented minute-foaming layer by the crystalline orientation in thin molding, so that high rigidity and high specific modulus can be maintained along with lighter weight obtained.

Consequently, when a resin-molded component obtained according to the present invention is applied to, for example, a diaphragm for use in a loudspeaker, such effectiveness as high resonance frequency of a diaphragm, expansion of reproduction frequency band, and the like can be obtained.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A resin-molded component formed by injection-molding thermoplastic resin in which crystallization is facilitated in a resin flowing direction, said component comprising:
   an integral five-layer cross-sectional structure formed entirely of thermoplastic resin with built in unfoamed skin layers formed as front and rear surfaces of the component,
   a first foaming layer and a second foaming layer respectively formed under said unfoamed skin layers of the front and rear surfaces, having substantially cylindrically-shaped foaming cells, the foaming cells having a length of at least twice a diameter thereof in the resin flowing direction on molding, and
   an unfoamed core layer positioned between said first foaming layer and said second foaming layer;
   wherein the thermoplastic resin is substantially composed of a polyolefin composition containing ultra-high molecular polyolefin;
   wherein, said first and second foaming layers are formed within the integral structure by dissolving carbon dioxide gas at a predetermined pressure within the thermoplastic resin when molded; and
   wherein said component has a cone shape with a small diameter portion at one end and a large diameter portion at an opposite end, and said foaming cells are arranged such that the length thereof extends in a direction between the small diameter portion and the large diameter portion.

2. A loudspeaker diaphragm formed by injection-molding thermoplastic resin in which crystallization is facilitated in a resin flowing direction, said diaphragm comprising:
   an integral five-layer cross-sectional structure formed entirely of thermoplastic resin with built in unfoamed skin layers formed as front and rear surfaces of the loudspeaker diaphragm,
   a first foaming layer and a second foaming layer respectively formed under said unformed skin layers of the front and rear surfaces, having substantially cylindrically-shaped foaming cells, the foaming cells having a length at least twice a diameter thereof in the resin flowing direction on molding, and
   an unfoamed core layer positioned between said first foaming layer and said second foaming layer;
   wherein the thermoplastic resin is substantially composed of a polyolefin composition containing ultra-high molecular polyolefin;
   wherein, said first and, second foaming layers are formed within the integral structure by dissolving carbon dioxide gas at a predetermined pressure within the thermoplastic resin when molded;
   wherein said diaphragm has a cone shape with a small diameter portion at one end and a large diameter portion at an opposite end, and said foaming cells are arranged such that the length thereof extends in a direction between the small diameter portion and the large diameter portion.

* * * * *